United States Patent
Wendt et al.

(10) Patent No.: US 6,611,357 B2
(45) Date of Patent: Aug. 26, 2003

(54) METHOD OF STIPULATING VALUES FOR USE IN THE CONTROL OF A PRINTING MACHINE

(75) Inventors: Karsten Wendt, Obertshausen (DE); Peter Schramm, Frankfurt (DE)

(73) Assignee: MAN Roland Druckmaschinen AG (DE)

( * ) Notice: Subject to any disclaimer, the term of this patent is extended or adjusted under 35 U.S.C. 154(b) by 315 days.

(21) Appl. No.: 09/769,966

(22) Filed: Jan. 26, 2001

(65) Prior Publication Data

US 2001/0030758 A1 Oct. 18, 2001

Related U.S. Application Data

(63) Continuation of application No. 08/912,606, filed on Aug. 15, 1997, now abandoned.

(30) Foreign Application Priority Data

Aug. 16, 1996 (DE) ......................... 196 32 969

(51) Int. Cl.⁷ .............................................. G06K 15/00
(52) U.S. Cl. ....................................... 358/1.9; 382/167
(58) Field of Search ................................. 358/1.9, 1.12, 358/1.18, 2.1, 3, 3.01, 3.02, 3.1, 3.12, 3.27; 101/484, 485, 365, 211; 356/407, 425; 702/108; 382/112, 167, 163, 164

(56) References Cited

U.S. PATENT DOCUMENTS

| | | | |
|---|---|---|---|
| 3,995,958 A | 12/1976 | Pfahl et al. | |
| 4,417,818 A | 11/1983 | Weisner | |
| 4,649,423 A | 3/1987 | Hoffrichter et al. | |
| 4,649,502 A | 3/1987 | Keller et al. | |
| 4,660,159 A | 4/1987 | Ott | |
| 4,665,496 A | 5/1987 | Ott | |
| 5,149,960 A | 9/1992 | Dunne et al. | |
| 5,182,721 A | 1/1993 | Kipphan et al. | |
| 5,224,421 A | 7/1993 | Doherty | |
| 5,530,656 A | 6/1996 | Six | |
| 5,551,342 A | 9/1996 | Fuchs et al. | |

FOREIGN PATENT DOCUMENTS

| | | |
|---|---|---|
| DE | 3804941 A1 | 8/1989 |
| DE | 39 03 981 A1 | 8/1990 |
| DE | 43 11 132 A1 | 11/1993 |
| DE | 42 40 077 A1 | 6/1994 |
| DE | 44 31 270 A1 | 4/1995 |
| DE | 43 43 905 A1 | 6/1995 |
| DE | 43 43 905 C2 | 2/1996 |
| DE | 196 32 969 C2 | 4/1999 |
| EP | 0 142 469 B1 | 10/1984 |
| EP | 0 142 470 A1 | 10/1984 |
| EP | 0 142 469 | 9/1987 |
| EP | 0 142 470 B1 | 1/1988 |
| JP | 59 52069 B1 | 7/1979 |
| JP | 3011907 B1 | 12/1999 |

*Primary Examiner*—Gabriel Garcia
*Assistant Examiner*—King Y. Poon
(74) *Attorney, Agent, or Firm*—Leydig, Voit & Mayer, Ltd.

(57) ABSTRACT

A method is described of determining stipulated values for the production of multicolor printed copies, in particular for the production of multicolor printed copies on a printing machine working in half-tone, a reflectance desired value being assigned in the case of an original, in at least one image element having given area coverage of the individual colors to be used in the print, and this at least one reflectance desired value being used during the subsequent printing, in conjunction with a reflectance actual value, in particular for the derivation of adjustment commands for the ink feed so that the subsequently produced print satisfies the best possible color and in particular calorimetric agreement with stipulated values specified during the creation of a printed original. According to the invention, this is achieved by the image elements of the original being assigned desired color loci in each case, and from the spectra or color density spectra of the individual colors used in the subsequent print, as well as their proportion of printing area in the respective image elements, a spectrum of color density spectrum, given calorimetric assessment, yields the best possible approximation to the stipulated desired color locus.

22 Claims, 3 Drawing Sheets

METHOD OF STIPULATING VALUES FOR USE IN THE CONTROL OF A PRINTING MACHINE

CROSS REFERENCE TO RELATED APPLICATION

This application is a continuation of U.S. application Ser. No. 08/912,606 filed on Aug. 15, 1997, now abandoned.

BACKGROUND OF THE INVENTION

The invention relates generally to printing machines and, more particularly, relates to a method of stipulating values for use in connection with the open-loop or closed-loop control of a printing machine.

In the production of printed products it is known to register the application of ink quantitatively on measurement elements which are additionally printed at the same time or at measurement points in the actual printed image. Widespread use is made of the so-called color density measurement, in which measurement points having one or more printing inks are measured using appropriate filters in order to determine the ink film thickness. It is likewise known to measure measurement points, i.e., printing control strips or measurement points in the image, calorimetrically, in order, via the actual color loci thus obtained in conjunction with prescribed, desired color loci, including appropriate color offset (vector) formation, to derive the necessary actuating variables for the correction of the printing process. Furthermore, spectral measuring methods are known in which reflectances are determined over a multiplicity of reference points or continuously, for example, within the visible spectrum. In this case, the registered actual spectrum of a sample point of the printed product is compared with a prescribed desired spectrum, for example, a sample sheet or original, in order to derive therefrom the appropriate actuating commands for the ink feed. Spectral measurement and control methods of this type are typically used in gravure printing, since, in the case of this printing process, the additions to be fed to a color for the purpose of reaching a desired reflectance can be determined in a simple way from a registered spectral difference.

By way of example, DE 4 311 132 A1 discloses a method for effectuating closed-loop/open-loop control in a printing machine. In the disclosed method, the density spectra of sample prints of the individual printing inks with a stipulated area coverage, as well as the paper whiteness, are stored, the density spectra of a least one measurement point per inking zone on an original and corresponding measurement points on the printed product are determined, and the measured density spectra of the original and the printed product are represented as a linear combination of the density spectra weighted with the degrees of area coverage of the sample prints of the individual printing inks and of the paper whiteness. Subsequently, the degrees of area coverage are calculated in such a way that the density spectra are approximated in an optimum manner by the linear combination. In this manner, the ink feed is changed, in the event of a deviation of the degrees of area coverage of printed product and original, until an equalization of the density spectra is achieved. What is disadvantageous in the case of this method is that the factors in the formulation of the linear combination in order to represent the overall density spectrum, i.e., the combined print of the image points, are formulated from the density spectra of the individual colors as degrees of area coverage. A formulation of this type with respect to the factors presents problems at high degrees of area coverage of a color at an image point and ultimately fails during the printing of one or more colors in full-tone. The reason for this is that if, for example, one color of the original is printed as a full-tone area, the corresponding color in the printed copy can likewise be printed only as a full-tone and, moreover, not more intensely. Furthermore, this method presupposes that there already exists an original which was produced exactly with the printing inks used in the subsequent print, and on which the spectral reflectances are then determined at the corresponding image points.

By way of further example, DE 4 343 905 C2 discloses a method of determining the necessary change in the ink feed in a multicolor printing machine, in particular, an offset printing machine. In this method, the color density spectra of at least one colored image point and, simultaneously, the individual printing inks involved in the color at the point are recorded with regard to an original copy. In the case of each following printed copies, the color density spectra of the original and the printed copy are represented as a linear combination of the color density spectra of the individual colors, which are weighted with degrees of area coverage and paper whiteness. The degrees of area coverage of the individual colors are determined by linear regression. Based upon a comparison of the color density spectra, the derivation of an ink feed adjustment is performed in order to equalize the inking of the product copy to that of the original copy.

The comparison is accomplished by a differential color density spectrum which is determined from the color density spectra of corresponding image points of the original and of the printed copy and, in addition, the color density spectra of the printing inks (colored inks+black) involved in the print of the colored image. The differential color density spectrum between the original and printed copy is then represented as a linear combination of the color density spectra of the printing inks (colored inks+black) involved in the print of the printed copy, the coefficients of this linear combination being determined with the aid of linear regression. The coefficients which are determined from the linear combination then give a measure as to how the individual colors (colored inks+black) involved in the print of the printed copy must be changed in terms of their proportions. In the case of this method, it is irrelevant whether the original has been printed with the printing inks used later, or whether the original has even been produced using a quite different reproduction process. This color control method also operates using theoretically stipulated desired color density spectra.

Further methods disclosed in DE 4311 132 A1 and DE 4 343 905 C2 require that the desired color density spectra be determined at a multiplicity of image points of an original. A multiplicity of the printed products produced is set up as an original on image processing computers. Known art additionally permits the image data obtained in this manner, following appropriate color separation and subsequent raster image processing, to be further processed directly in order to generate the necessary printing forms, i.e., printing plates in offset printing. In the case of a purely digital workflow between the generation of the printing original and of the printing forms/printing plates to be used for printing, it is possible to dispense entirely with the production of originals in the form of sample prints, proofs or the like. In this case, it is even possible to stipulate desired colored loci of the digital original in the strictly calorimetric sense, since, by using color management systems, the characteristics of the color change between the output devices and the monitor of an image processing station/printing machine can be taken into account.

In DE 4 343 905 C2 yet another method for determining the necessary change of the ink feed in a multicolor printing machine is disclosed which has decisive advantages with regard to the convergence of the actual color density spectra of the printed copies which are to be guided to the desired color density spectra. However, this process presupposes previously known desired color density spectra and is in no way integrated into the color management systems which are known at present since color loci, i.e., desired color locus, actual color locus, are not used in this method.

EP 0 142 470 B1 discloses still a further method and device for assessing the print quality of a printed product which is preferably produced on an offset printing machine. In order to assess the print quality, the printed product and an original are each divided into image elements and measured photoelectrically image element by image element. The desired and actual reflectance values of each individual printing ink are registered densitometrically and use is also made of a sensation weighting factor specifying the relation between subjectively measured and metrological color deviation, given appropriate reflectance values. However, this method offers no possibility of deriving desired color density spectra from a printed original, in particular, one which is present in digital form, which spectra can then be used in particular in a method such as disclosed in DE 4 343 905 C2 for the production of printed products.

Likewise, EP 0 142 469 B1 discloses a method for the closed-loop control of the ink feed in an offset printing machine in which, at least during the start-up phase of the printing machine, in order to control the initial print of the individual printing inks, a reference in the form of the respective printing plate or a photographic original on which it is based is divided into a multiplicity of image elements and for each image element the area coverage is determined. From this, reflectance desired values are formed which are compared with reflectance values obtained image element by image element on the printing elements and are used for the derivation of actuating commands for the ink feed. As in the case of the method disclosed in EP 0 142 470 B1, this procedure also does not supply any desired color density spectra which would then be used for the control of the ink feed.

OBJECTS AND SUMMARY OF THE INVENTION

It is, therefore, a general object of the present invention to provide a method of stipulating values for use in the control of a printing machine. More particularly, it is an object of the invention to provide such a method that avoids the above-mentioned disadvantages while enabling a determination of desired spectra or desired color density spectra of image points of an original, in particular, a digital original.

According to the invention, it is provided that, in a digitally produced image original, a specification of the corresponding measurement fields is performed to the effect that, using these measurement fields, the subsequent print is also controlled, open-loop or closed-loop, during the production of the individual printed products. During the open-loop or closed-loop control of the print, use is preferably made of a method which, as explained above, determines the difference between a desired and an actual density spectrum and represents the so-called differential color density spectrum as a linear combination of the printing inks (colored inks+black+special inks) used in the print. By means of the area coverage of the individual colors, which can be derived from the digital image original, the spectra of the colors to be used during printing and the desired color loci which can be assigned to the image points, desired spectra or desired color density spectra are then determined on the basis of a model simulating the combined print.

In order to determine the desired color density spectrum a desired spectrum for a measurement field of the digital original is first determined. This spectrum is then used, if appropriate following conversion by taking logarithms into a desired colored density spectrum, for the open-loop/closed-loop control in accordance with the above-mentioned method.

A better understanding of the objects, advantages, features, properties and relationships of the invention will be obtained from the following detailed description and accompanying drawings which set forth an illustrative embodiment and are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
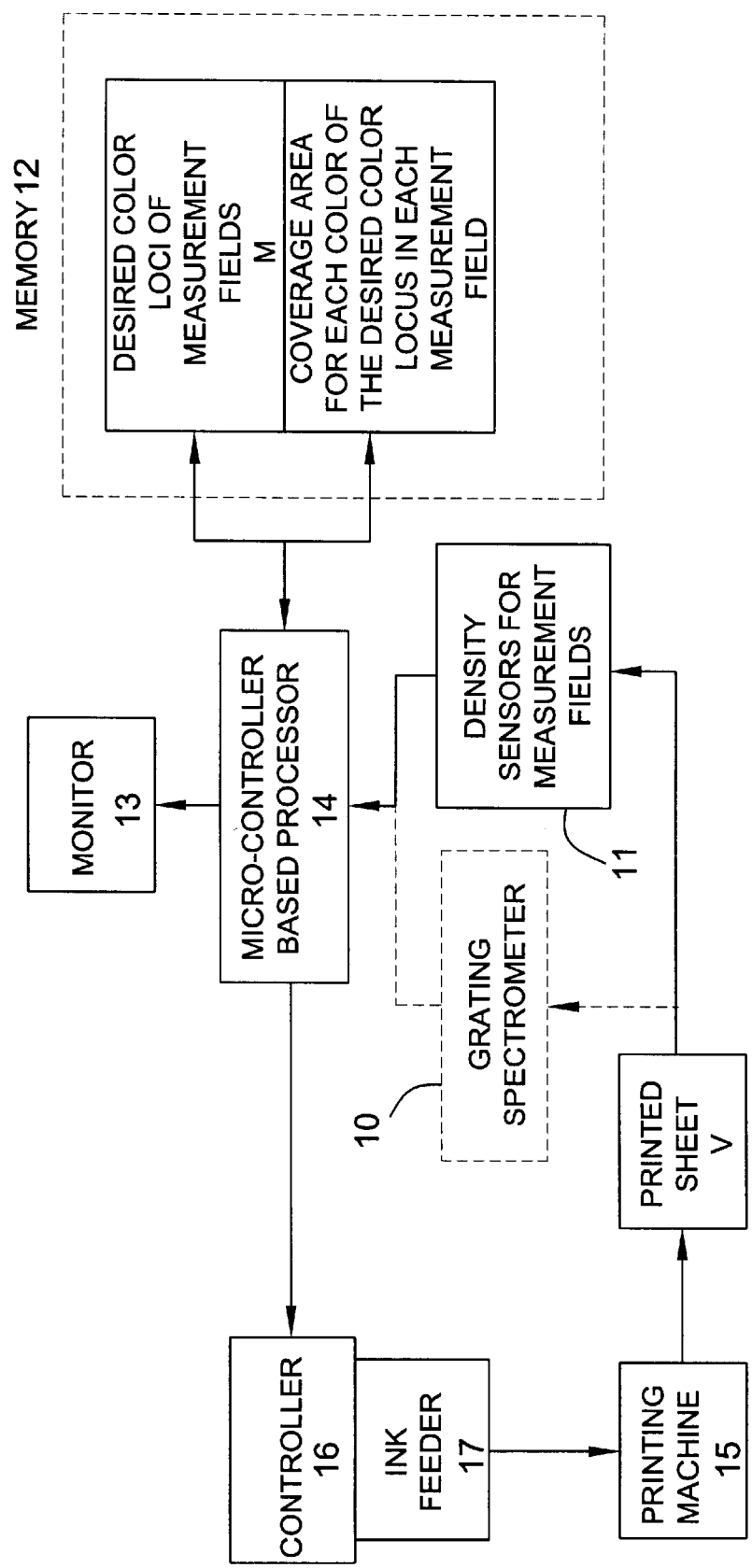
FIG. 1 shows a schematic, block diagram of a system in which an embodiment of the invention is implemented.

In the illustrative embodiment, the term measurement field is used, both in the original and in the printed copies to be produced subsequently, to refer to regions of defined size (e.g. 5×5 mm$^2$) comprising one or more image elements, on which the regions actual reflectances can then be registered in the sense of spectral actual values. The term spectrum means that both metrologically and computationally a plurality of reflectance values in the visible spectral range, preferably also in the near infrared, are registered or taken into account. This can be performed in a simple way by using a grating spectrometer 10 as illustrated in FIG. 1. As an alternative to this, it is also possible to operate with a plurality of discrete spectral values with subsequent interpolation.

Furthermore, it should be pointed out that the method according to the invention may be applied both by using the spectra and also the color density spectra of the individual printing inks and of the corresponding combined print of the individual printing inks within the measurement fields or regions. During the calculation of a desired spectrum with a given desired color locus, given area coverage of the individual colors and their spectra the overall spectrum of the combined print accordingly results as a multiplication of the weighted or scaled individual spectra of the individual colors involved in the combined print in accordance with their proportion of area coverage.

When calculating a desired color density spectrum, the procedure can be exactly the same, that is to say, first the desired spectrum is calculated at a given desired color locus, a given area coverage of the individual colors and their spectra, with the calculated desired spectrum being converted by taking logarithms into a desired color density spectrum for the purpose of the greatest possible approximation to the desired color locus.

As an alternative to this, the desired color density spectrum at a given desired color locus of a measurement point can also be calculated by means of a summation of the color density spectra of the individual colors weighted according to the proportions of printing area. This can be accomplished using several conventional sensors 11 as illustrated in FIG. 1. This approach is explained in more detail below as an exemplary embodiment.

Initially, a printing original image V is created on a data processing system as illustrated in FIG. 1, wherein all of the image data of this original image V is stored in memory 12. In this explanatory example, it is assumed that the image of the original image V is a subject which is subsequently to be printed in four colors. The original image V is to be copied using the three basic colors (yellow, magenta, cyan) as well as the additional printing ink black. The data processing system comprises a micro-controller 14 that may be microprocessor-based and configured in a conventional manner. The micro-controller 14 is programmed to control a controller 16, which controls the ink feeder 17 for metering ink to the printing machine 15. The metering of ink is controlled in keeping with the method described hereinafter.

In the original image V, which can be represented on the monitor 13 of the image data processing system, a number of measurement fields $M_a$, $M_b$, $M_c$, are specified in accordance with the image construction/image distribution. The distribution of the measurement fields $M_a$, $M_b$ and so on relates to points in the subject which are important to the image and which, in particular, have color parts or the like which are significant for appearance. In this case, each large-screen image point may be a measurement point for use in subsequent print control.

Figure 2:
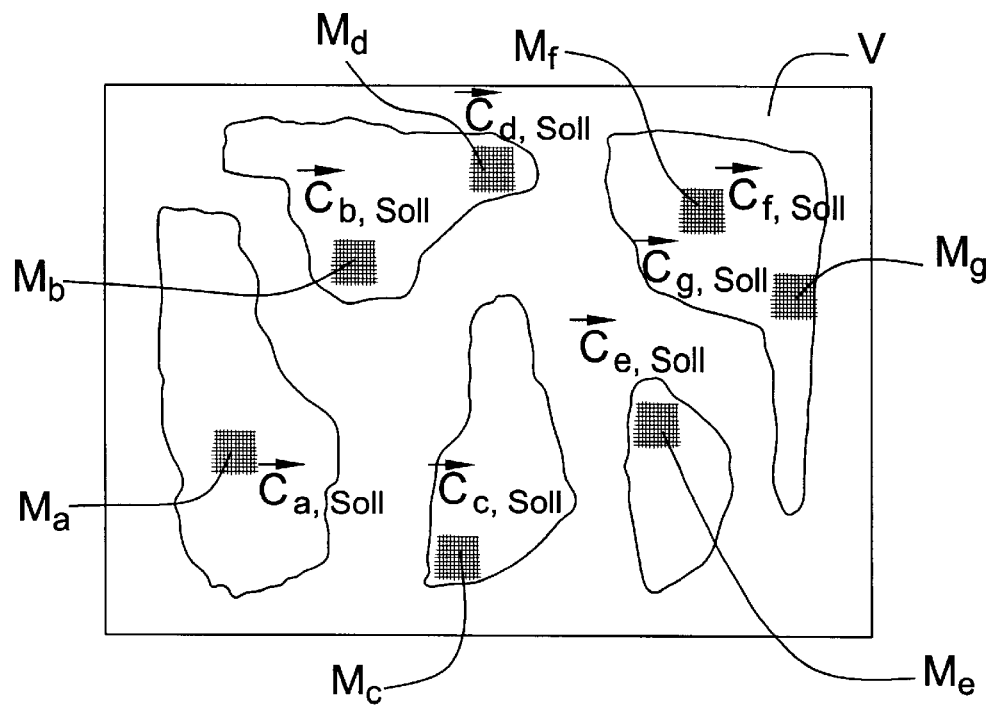
FIG. 2 shows the arrangement of a plurality of measurement fields in the subject of an original to be printed in accordance with the invention.

By way of example, using the measurement field $M_a$ shown in FIG. 2, an explanation of the method in accordance with an embodiment of the invention is provided. For this measurement field $M_a$, which is specified on the digitally produced original image V, a desired color locus $C_{a, Soll}$ which is to be achieved in the subsequent production or print is allocated, in particular, using a color management system. The other measurement fields $M_b$, $M_c$, which are distributed over the entire original image V depending on the structure of the subject, are allocated desired color loci $C_{b, Soll}$ $C_{b, Soll}$ etc. in a corresponding manner.

From the original image V, set up digitally on an image processing system, following a color separation corresponding to the colors to be used during printing, as well as a corresponding screening (RIP), data is produced which is necessary, for example, for direct production of a printing plate by means of a plate setter(not shown). At the end of a further process which is known per se, the printing forms/printing plates necessary for the production of the colored print by the printing machine 15 are available. In addition to this image processing (color separation/screening), on the basis of a relatively coarse screen, the degree of area coverage of each of the individual printing inks in the corresponding color separations is determined, for example, for presetting the inking zones. For the measurement field $M_a$ or for all the image elements of the measurement field $M_a$, the respective degrees of area coverage $A_{a, cyan}$, $A_{a, magenta}$, $A_{a, yellow}$, and $A_{a, black}$ and the associated desired color loci $C_{a, Soll}$, $C_{b, Soll}$, etc. are thus available. This determination of the area coverage can be performed not only using so-called coarse-screen image data, for example, conventional CIP3 data format, but can also be produced from the data obtained from printing plate screening carried out following the plate production.

Figure 3:
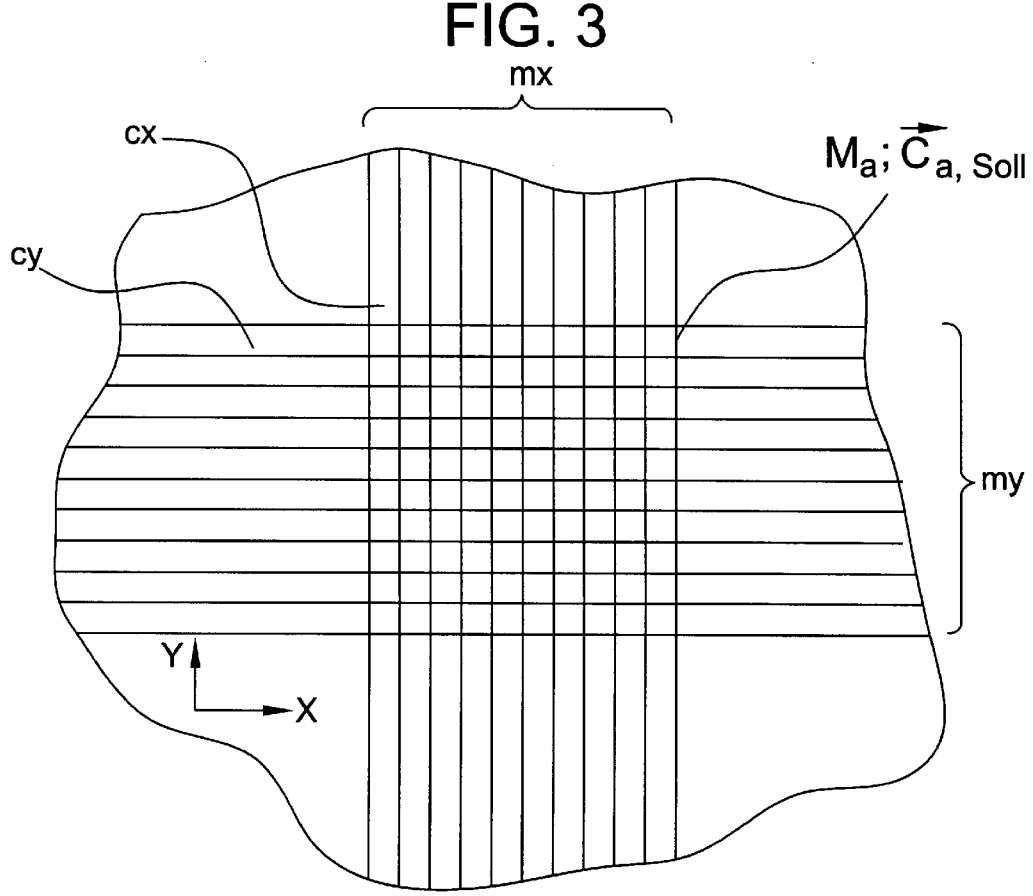
FIG. 3 shows the division of the measurement field of FIG. 2 into image element.

Turning to FIG. 3, the measurement field $M_a$ of the original image V according to FIG. 2 has been enlarged. The x,y axes reproduce the directions of a division of the screening or of the image data of the original image V. The scaling cx, cy over the lengths mx, my, respectively, of the measurement field $M_a$ represents a division of the measurement field $M_a$ into a number of appropriately large area elements. This scaling corresponds to the resolution of the original image V in accordance with the data size, the screening of the subsequent print, or a coarse screen comprising a large number of image points or pixels, for example, in the CIP3 format. In the exemplary embodiment, the scaling cx, cy corresponds to a coarse screening in the sense of the CIP3 format which results in a corresponding reduction in the image data to be carried out in accordance with the following description. In keeping with the foregoing, within the measurement field $M_a$, the degrees of area coverage of all the coarse screen image elements of edge length cx, cy are known for the individual printing inks cyan, magenta, yellow, black.

Figure 4:
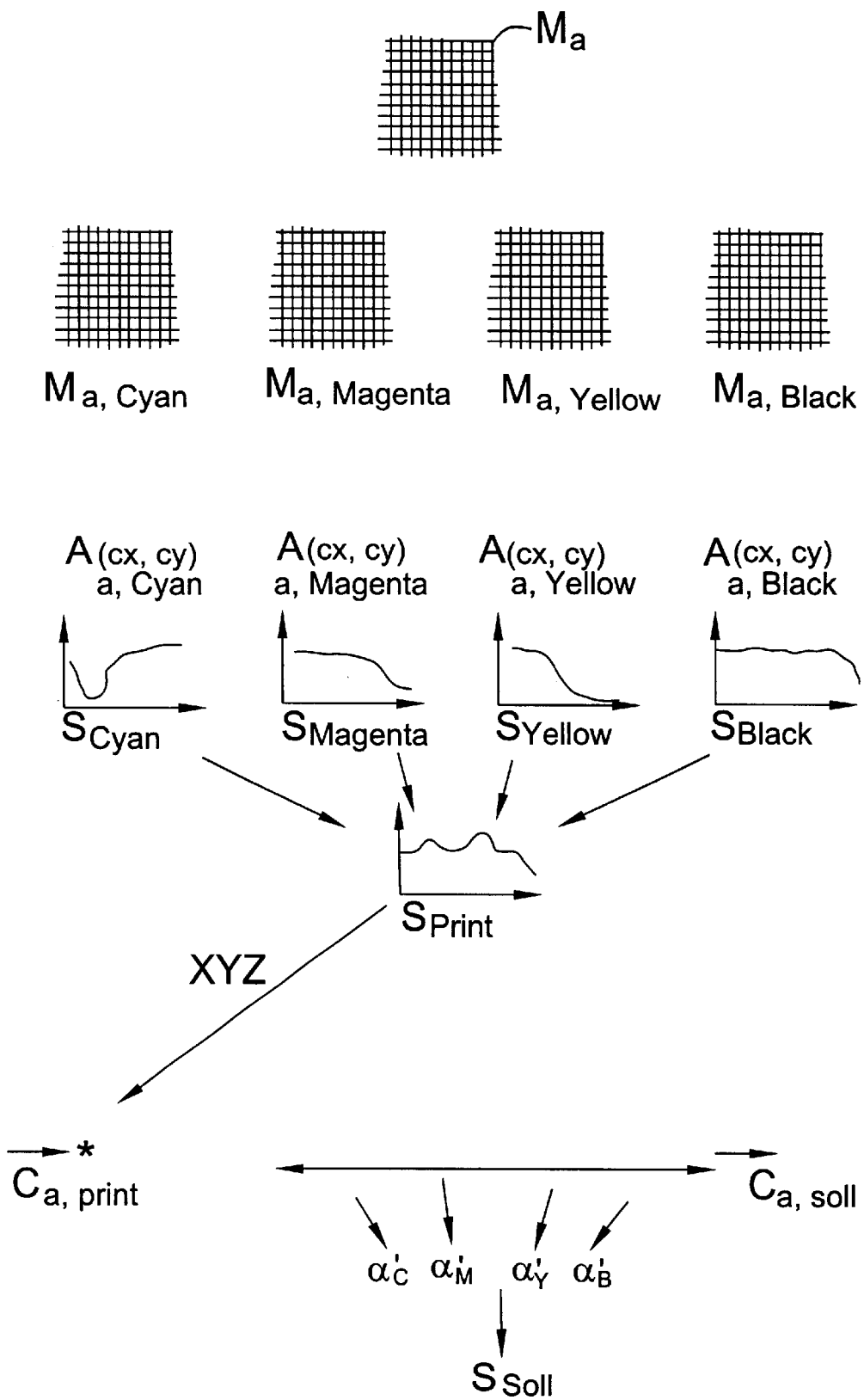
FIG. 4 shows the determination of a desired color density spectrum for a measurement field in FIG. 3.

In accordance with the method for determining desired color density spectra for the measurement field $M_a$, which has been picked out here by way of example, it is assumed that the color density spectra $S_{cyan}$, $S_{magenta}$, $S_{yellow}$, $S_{black}$ of the printing inks used in the subsequent print have been previously stored in the memory 12. Thus, for each individual printing ink for each coarse screen image element within the measurement field $M_a$, $M_{a, cyan}$, $M_{a, magenta}$, $M_{a, yellow}$, $M_{a, black}$, as illustrated in FIG. 4, there exists for each of the color separations an area coverage $A_{a, cyan}$ (cx, Cy), $A_{a, magenta}$ (cx, cy), $A_{a, yellow}$ (cx, cy), $A_{a, black}$ (cx, cy).

The measurement field $M_a$ of the original image V is allocated a desired color locus $C_{a, Soll}$ which is to be achieved in the print. This desired color locus is held in the memory 12. By summing over all the image elements having the coordinates cx, cy within the measurement field Mar corresponding to the area coverage $A_{a, cyan}$ (cx, cy), $A_{a, magenta}$ (cx, cy), $A_{a, yellow}$ (cx, cy), $A_a$, black (cx, cy) of the individual colors placed into the memory 12 in conjunction with the stored color density spectra $S_{cyan}$, $S_{magenta}$, $S_{yellow}$, $S_{black}$, of the printing inks used in the subsequent print. Thus, for each individual printing ink for each coarse screen image element within the measurement field $M_a$, $M_{a, cyan}$, $M_{a, magenta}$, $M_{a, yellow}$, $M_{a, black}$, which can be assigned to the color separations, the coverage area of the individual colors, $A_a$, cyan (cx, cy), $A_{a, magenta}$ (cx, cy), $A_a$, yellow (cx, cy) $A_{a, black}$ (cx, cy) in conjunction with the store color density spectra $S_{cyan}$, $S_{magenta}$, $S_{yellow}$, $S_{black}$, determines the resulting color density spectrum of the combined print. For example, for an image element at the point cx, cy, the resulting color density spectrum $S_{a, Print}$ (cx, cy) of the combined print (four-color print) is as follows:

$$S_{a, Print}(cx,cy) = A_{a, cyan}(cx,cy) \cdot S_{cyan} + A_{a, magenta}(cx,cy) \cdot S_{magenta} + A_{a, yellow}(cx,cy) \cdot S_{yellow} + A_{a, black}(cx,cy) \cdot S_{black}$$

In this simplified formulation, each color prints with intensity 1, that is to say, the individual spectra are unweighted.

If scaling factors $\alpha_{a, cyan}$, $\alpha_{a, magenta}$, $\alpha_{a, yellow}$, $\alpha_{a, black}$ are introduced, then, by means of these factors (in general $\alpha_i$, with i=cyan, magenta, yellow, black and further colors), the proportion of the individual colors in the color density spectrum of the combined print $S_{a, Print}(cx,cy; \alpha_i)$ can be varied. Furthermore, the following variable are thus used:

$S_{a,Print}(cx,cy; \alpha_i) = \alpha_a,$ $_{cyan} \cdot A_{a, cyan}(cx,cy) \cdot$ $S_{cyan} + \alpha_a, _{magenta} \cdot A_a,$ $_{magneta}(cx,cy) \cdot S_{magenta} + \alpha_a,$ $_{yellow} \cdot A_{a, yellow}(cx,cy) \cdot$ $nS_{yellow} + \alpha_a, _{black} \cdot A_a,$ $_{black}(cx,cy) * S_{black}$ This color density spectrum of the combined print $S_a$, Print (cx, cy; $\alpha_i$) for an image element cx, cy can now be converted into a color locus $C_a$ (cx, cy; $\alpha_i$) of the combined print, using the known calorimetric response curves (X, Y, Z) of the CIE standard observer.

Finally, the scaling factors $\alpha_i$ (i=cyan, magenta, yellow, black) are optimized by means of variation in such a way so that the overall color locus $C^*_a(\alpha_i)$ calculated in accordance with the model formulation illustrated above is equal to the desired color locus $C_{a, Soll}$ assigned to the measurement field $M_a$, except for a stipulated tolerance color offset. This variation formulation emerges from the fact that the following variable:

$$\Sigma_i (1-\alpha_i)^2$$

is a minimum, this summation being performed over all i (i=cyan, magenta, yellow, black), that is to say over all the scaling factors assigned to the individual colors.

The scaling factors $\alpha'_i$ satisfying the above criterion can now be used in the formula further above, so that:

$S_{a, Print}(cx,cy)_{Soll} = \alpha'_a, _{cyan} \cdot A_a,$ $_{cyan}(cx,cy) \cdot S_{cyan} + \alpha'$ $_{a, magenta} \cdot A_{a, magneta}$ $(cx,cy) \cdot S_{magenta} + \alpha'_a,$ $_{yellow} \cdot A_{a, yellow}(cx,cy) \cdot$ $S_{yellow + \alpha'a, black} \cdot A_a,$ $_{black}(cx,cy) \cdot S_{black}$ A weighted summation over all the $S_{a, Print}(cx, cy)_{Soll}$ of the image elements cx, cy within the measurement field $M_a$ finally yields the desired color density spectrum $S_{a, Print Soll}$ of the measurement field $M_a$, which is used as a basis as the stipulated value in the production of the printed copies.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalent thereof.

What is claimed is:

1. A method of stipulating values for use in the control of a printing machine, which produces multicolor printed copies from a digitally produced image original, comprising the steps of:

assigning a desired color locus to at least one image element in the digitally produced image original to be achieved in production of multicolor printed copies;

determining, from proportions of the printing area of individual colors within the image element, a desired color spectrum by varying spectra of the individual colors in such a way that the desired color spectrum, given colorimetric assessment, essentially yields the desired color locus; and using a reflectance desired value corresponding to a given area coverage of individual colors to be used in production of the multicolor printed copies in conjunction with a reflectance actual value corresponding to the desired color spectrum, the reflectance actual value derived by minimally varying actual area coverage, $\alpha_i A_{ij}$, of the individual colors to generate the desired color spectrum, where furthermore at least one $\alpha_i$ is not equal to 1 whereby at least color$_i$'s area coverage is changed, to perform a derivation of adjustment commands which control ink feed in the printing machine so that the multicolor printed copies are in essential colorimetric agreement with the digitally produced image original.

2. The method according to claim 1, wherein the step of determining a desired color spectrum is performed for a number of image elements located within a measurement field provided for print control in the printing machine.

3. The method according to claim 1, wherein the step of determining a desired color spectrum further comprises the step of converting the desired color spectrum into a desired color density spectrum using logarithms.

4. The method according to claim 1, wherein the step of determining a desired color spectrum is performed using a computing model which reproduces a combined print of the individual colors corresponding to the proportions of the printing area of the individual colors within the image elements in conjunction with the color density spectra of the individual colors.

5. The method according to claim 4, wherein the computing model further utilizes a scaling factor which is variable.

6. The method according to claim 1, wherein the image element comprises a plurality of pixels of the digital image.

7. The method according to claim 1, wherein the proportions of the printing area of the individual colors within the image element are determined from examining data corresponding to the digital image following color separation.

8. A method for stipulating a desired-color locus of a measurement field in a, preferably digital, original image to derive signals to control an ink feed in a printing machine making copies of said image, said method comprising:

dividing the measurement field into a plurality of area elements;

calculating, for an area element j of the plurality of area elements, a relative area $A_{ij}$ to be printed by a printing ink i with a known spectral distribution $S_i$ where the subscript i represents a specific ink;

estimating an area-element-color distribution by summing, over all the inks to be used in printing, a product of the relative area $A_{ij}$ and the corresponding spectral distribution of the ink i, and a weight $\alpha_i$ which is initially set to 1;

estimating an actual-color distribution for the measurement field by combining the area-element-color distributions for each of the area-elements in the measurement field;

estimating an actual-color density distribution from the actual-color distribution; estimating an actual-color locus from the actual-color density distribution;

determining a new value for the weight, $\alpha_i$ corresponding to the printing ink i such that the desired-color locus and the actual-color locus are within a stipulated tolerance color offset;

choosing $\alpha_i$, if more than one choice is possible, so that the sum over index i, corresponding to the printing inks, of $(1-\alpha_i)^2$ is a minimum, and at least one $\alpha_i$ is not equal to one; and printing an area equal to $(A_{ij})(\alpha_i)$ with printing ink i.

9. The method of claim 8 where the desired-color locus is specified by a color management system.

10. The method of claim 8 a desired-color distribution is determined for a number of area elements located within the measurement field provided for print control in the printing machine.

11. The method of claim 8 where a desired-color distribution is further converted into a desired-color-density distribution by using logarithms.

12. The method of claim 8 where the signals for controlling the ink feed are derived from a color-density distribution derived from logarithm of a color spectrum.

13. The method of claim 8 where the original image is a digital image.

14. The method of claim 13 where the relative areas $A_{ij}$ are determined from data corresponding to the digital image following color separation corresponding to the printing inks to be used in copying the digital image.

15. The method of claim 8 where color-density distributions obtained by taking the logarithm of the corresponding color distribution, and which are known to be proportional to a thickness of an ink film, are used in preference to the color distributions.

16. The method of claim 8 where the area-element-color distribution and/or a corresponding area-element-color density distribution, obtained by using logarithms, is used for presetting the inking zones.

17. A method for determining preset values for the manufacture of multi-color printed examples on a printing press, the printing press working by autotype, wherein with a master in at least one image element with given proportions of areas to be printed, the method comprising the steps of:

coordinating a plurality of individual inks to be used on printing to a spectral reflection desired value and to this at least one spectral desired reflection value on the subsequent print is brought into use in combination with a spectral reflection actual value for the manufacture of positioning commands for an ink feed;

using a representation of a spectral reflection of multi-color image elements (cx, cy; mx, my) as a coefficient containing linear combination from proportions of a surface to be printed as well as a spectra of the individual inks;

prescribing for each image element (cx, cy; mx, my) of the master a desired color position to be achieved in a later print such that for each image element (cx, cy; mx, my) determination of a desired ink spectrum or of the desired ink density spectrum takes place using a linear combination representing co-printing of the individual inks corresponding to their proportion of surface to be printed within the image element (cx, cy; mx, my) in combination with the spectra or ink density spectra of the individual inks;

providing the spectra or ink density spectra of the individual inks within the surface to be printed with a scaling factor ($x_i$) in each case within the linear combination corresponding to their proportion of printed surface within the image element (cx, cy; mx, my) and determining coefficients of the linear combination by varying scaling factors such that a color position emerging from the spectral reflection values in accordance with this linear combination corresponds to the desired color position; and using the spectral reflection values corresponding to this color position as reflection desired values in subsequent printing operations.

18. The method of claim 17 wherein the spectral reflection desired values are converted by taking logarithms into a desired color density spectrum underlying further processing.

19. The method of claim 18 wherein the spectral reflection values of the individual inks are converted by taking logarithms into ink density spectra and the desired ink spectrum is determined from the density spectra of the individual inks.

20. The method of claim 17 having the additional step of using as the image element (cx, cy; mx, my) in each case an image point (cx, cy) of a digitally generated master.

21. The method of claim 17 having the step of using as the image element (cx, cy) a surface element comprising in each case several image points (mx, my) of a coarse raster of a digitally generated master.

22. The method of claim 17 having the step of determining the proportion of surface to be printed of the individual inks in the image elements from the data of a digitally produced master following corresponding color separation.

* * * * *